(12) United States Patent  (10) Patent No.: US 9,027,341 B2
Meyer  (45) Date of Patent: May 12, 2015

(54) SYSTEM FOR A CHARGE-AIR-COOLER (75) Inventor: Robert Hornblower Meyer, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 13/185,118

(22) Filed: Jul. 18, 2011

(65) Prior Publication Data

US 2013/0019845 A1   Jan. 24, 2013

(51) Int. Cl.
*F02B 29/04* (2006.01)
*F02M 15/00* (2006.01)
*F02M 25/07* (2006.01)

(52) U.S. Cl.
CPC ........... *F02B 29/0468* (2013.01); *Y02T 10/146* (2013.01); *F02M 25/0707* (2013.01)

(58) Field of Classification Search
CPC ............. F02B 29/0468; Y02T 10/146; F02M 25/0707
USPC ........................ 60/599, 605.2; 123/542, 563
See application file for complete search history.

(56) References Cited

U.S. PATENT DOCUMENTS

| | | | |
|---|---|---|---|
| 1,803,097 A | 4/1931 | Critchlow | |
| 4,235,298 A | 11/1980 | Sackett et al. | |
| 4,852,526 A | 8/1989 | Brown | |
| 5,758,606 A | 6/1998 | Rosen et al. | |
| 6,681,171 B2 | 1/2004 | Rimnac et al. | |
| 6,786,210 B2 | 9/2004 | Kennedy et al. | |
| 7,131,263 B1* | 11/2006 | Styles | 60/278 |
| 2004/0079079 A1 | 4/2004 | Martin et al. | |
| 2006/0278377 A1* | 12/2006 | Martins et al. | 165/140 |
| 2008/0190079 A1 | 8/2008 | Cerdes | |
| 2009/0013977 A1 | 1/2009 | Brecheisen, II | |
| 2009/0014161 A1* | 1/2009 | Mihajlovic | 165/148 |
| 2009/0050117 A1 | 2/2009 | Tai et al. | |
| 2010/0077995 A1* | 4/2010 | Buia et al. | 123/542 |
| 2010/0229549 A1* | 9/2010 | Taylor | 60/599 |
| 2011/0094219 A1* | 4/2011 | Palm | 60/599 |
| 2011/0107760 A1* | 5/2011 | Quinn et al. | 60/599 |
| 2012/0055151 A1* | 3/2012 | Durand et al. | 60/599 |

FOREIGN PATENT DOCUMENTS

WO   2009/002233 A1   12/2008

* cited by examiner

*Primary Examiner* — Thai Ba Trieu
*Assistant Examiner* — Paolo Isada
(74) *Attorney, Agent, or Firm* — Greg Brown; Alleman Hall McCoy Russell & Tuttle LLP (57) ABSTRACT

Systems and methods for a charge-air-cooler are provided. The system may include an engine air passage, a charge-air-cooler including a plurality of heat exchange passages, and a condensate collector positioned within an interior of the charge-air-cooler, wherein the condensate collector is in fluid communication with at least one heat exchange passage and the engine air passage.

20 Claims, 4 Drawing Sheets

SYSTEM FOR A CHARGE-AIR-COOLER

BACKGROUND AND SUMMARY

Turbocharged and supercharged engines may be configured to compress ambient air entering the engine in order to increase power. Because compression of the air may cause an increase in air temperature, a charge-air-cooler may be utilized to cool the heated air thereby increasing its density and further increasing the potential power of the engine. If the humidity of the ambient air is high, however, condensation (e.g., water droplets) may form on any internal surface of the charge-air-cooler that is cooler than the dew point of the compressed air. During transient conditions such as hard vehicle acceleration, these water droplets may be blown out of the charge-air-cooler and into the combustion chambers of the engine resulting in increased potential for engine misfire, loss of torque and engine speed, and incomplete combustion, for example.

One approach for reducing the amount of condensation entering the combustion chambers is disclosed in US Patent Application Publication 2011/0094219 A1. In the cited reference, a condensation trap for a charge-air-cooler that reduces the rate at which condensation enters the combustion chambers of the engine is disclosed. The condensation trap includes a reservoir for collecting the condensate and a tube for releasing the condensate back to the outlet duct.

The inventors herein have recognized various issues with the above system. In particular, the condensation trap is positioned downstream of the charge-air-cooler and thus can only collect condensation downstream from an outlet of the charge-air-cooler. This configuration may not adequately address condensation trapped within the charge-air-cooler.

As such, one example approach to address the above issues is to position a condensate entraining system within the charge-air-cooler. Then, to solve the issue of removing the collected condensate, flow from the charge air of the chair-air-cooler can be harnessed. In this way, it is possible to drive condensate out of the charge-air-cooler while using a natural condensation collection point within the charge-air-cooler as a reservoir. Specifically, a condensate conduit couples the natural condensation collection point to an outlet passage of the charge-air-cooler. This configuration enables the condensate entraining system to readmit condensate droplets to the airstream. Further, by taking advantage of air pressure harnessed from the charge-air-cooler, the rate at which condensation enters the engine cylinders can be more regulated even during transients.

Note that additional condensation traps and readmitting systems may be used to reintroduce condensation into the airstream. Further, various methods may be employed to control the rate at which condensation is readmitted to the airstream. Further still, the various methods may be optimized according to engine operating conditions and ambient environmental conditions, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to embodiments of a charge-air-cooler with a condensate entraining system in a turbocharged engine for readmitting condensate droplets into the airstream. The condensate system may drive condensate accumulating in the charge-air-cooler into the airstream using some flow of the charge air. For example, a portion of the compressed charge air is drawn from one of the heat exchange passages and diverted to a condensate collection point. There, this flow (which has now been at least partially cooled from the cross-flow ambient air) entrains condensate and drives it into a delivery tube that can deliver it to the downstream engine air intake. The diversion may be accomplished through an air capture device that captures charge air (or another airflow) from a heat exchange passage and conveys the trapped air to the condensate collector. Further, the air capture device may include a tuning vent such that a captured charge air flow rate may be adjustable.

Such a configuration enables more consistent delivery of condensate into the combustion chambers of the engine, even during transient conditions. This is because the tuning vent may adjust the captured airflow to flow at a more consistent flow rate than even when the compressed engine air is adjusted to control the engine torque, for example.

Figure 1:
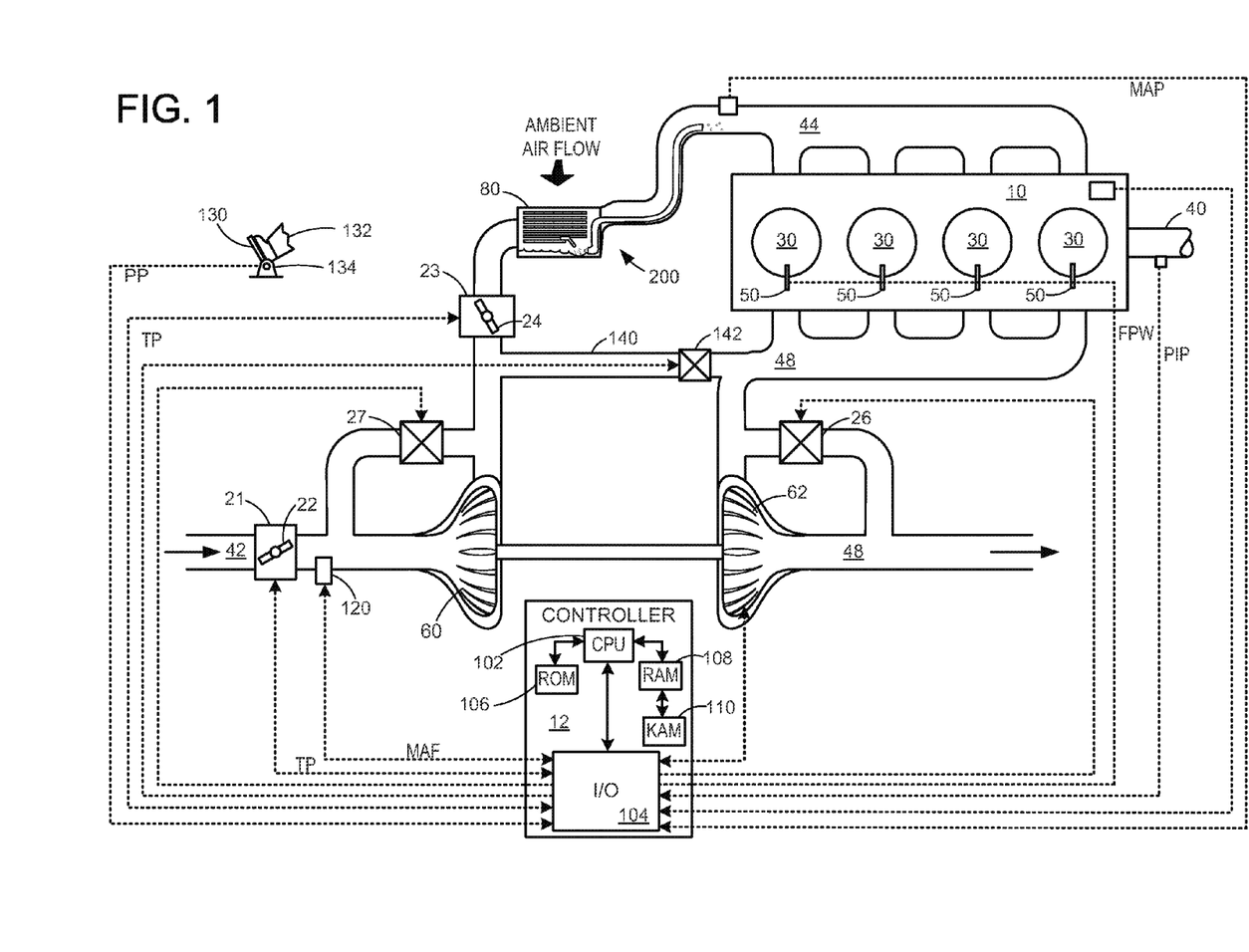
FIG. 1 is a schematic diagram of an example engine including a charge-air-cooler.
Figure 2A:
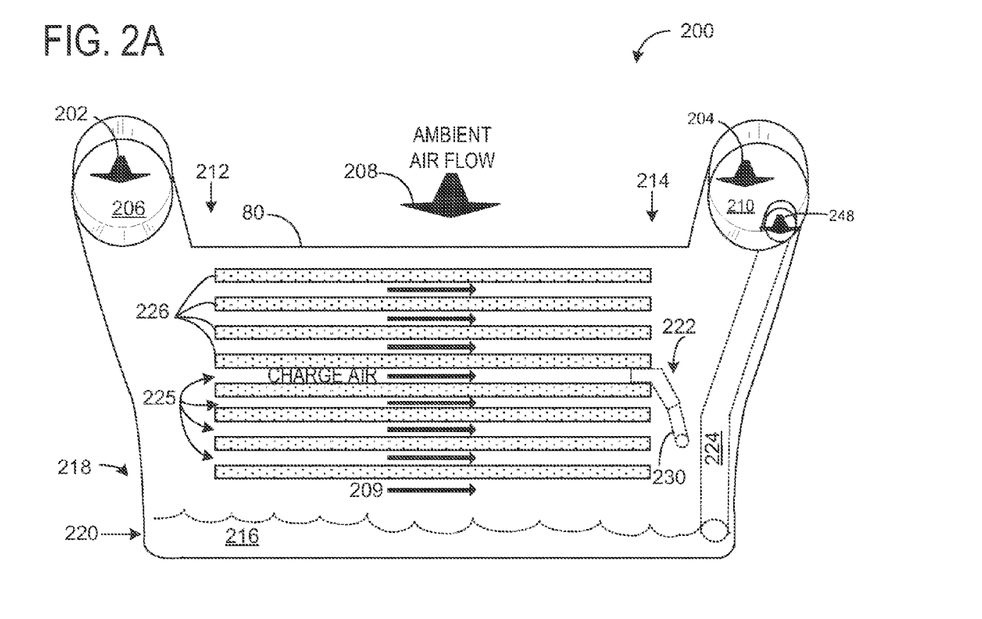
FIG. 2A is a schematic diagram of the charge-air-cooler of FIG. 1 including an example condensate entraining system.
Figure 2B:
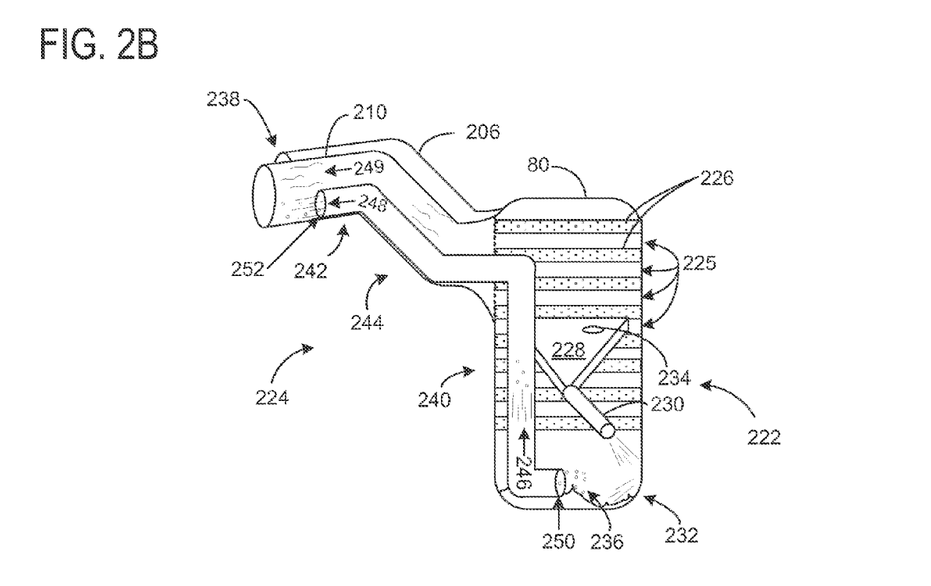
FIG. 2B is a perspective side view of the condensate entraining system of FIG. 2A.
Figure 3A:
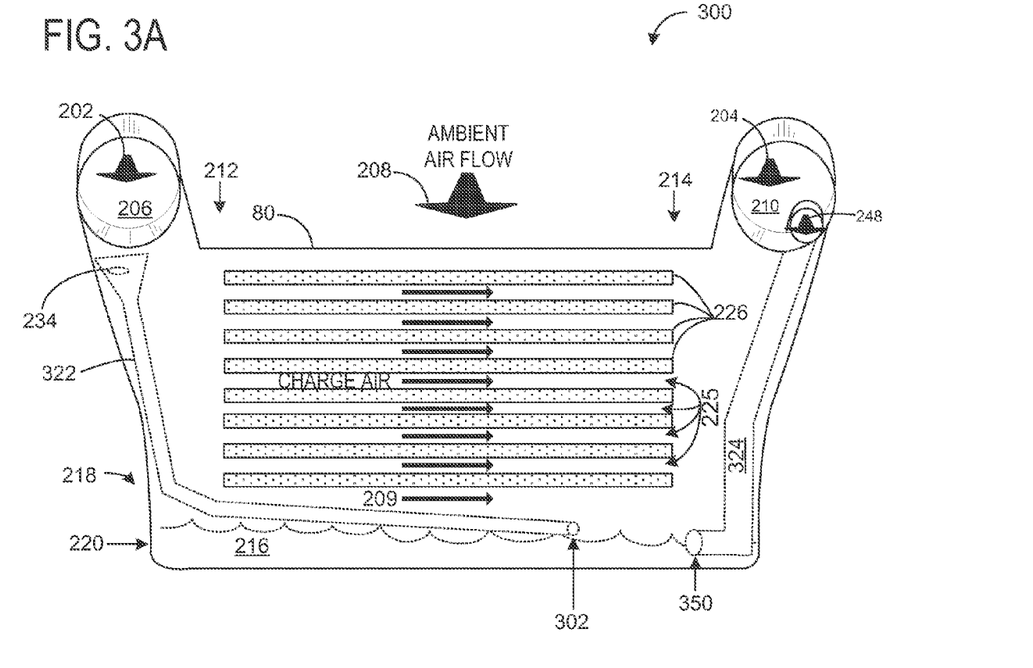
FIG. 3A is a schematic diagram of another example condensate entraining system for the charge-air-cooler of FIG. 1.
Figure 3B:
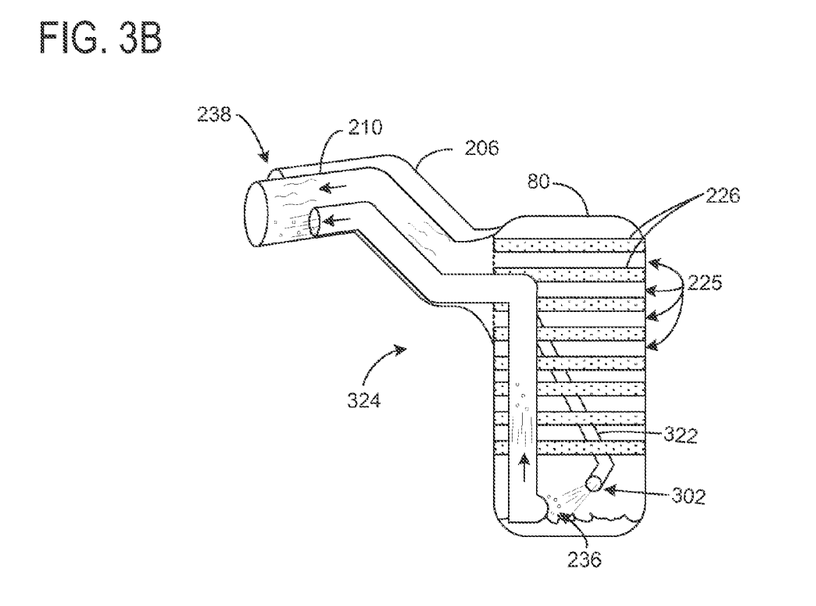
FIG. 3B is a perspective side view of the condensate entraining system of FIG. 3A.
Figure 4:
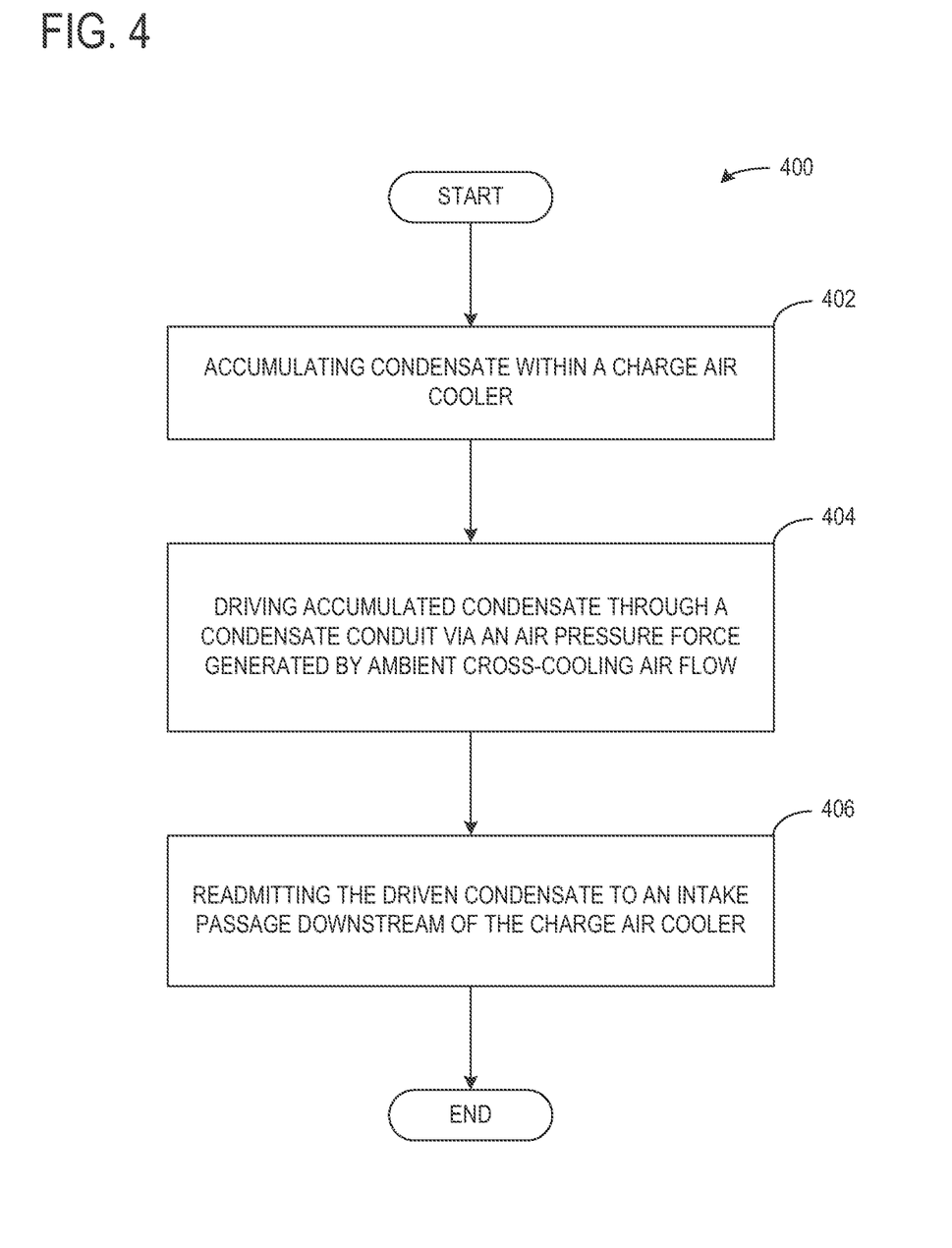
FIG. 4 is a flow chart showing an example method for entraining condensate.

FIGS. 1-3 show example embodiments of a condensate entraining system. The schematic diagram in FIG. 1 shows a turbocharged internal combustion engine with a condensate entraining system in fluid communication with a charge-air-cooler. FIGS. 2A-2B show a schematic diagram illustrating an example condensate entraining system. FIGS. 3A-3B show a schematic diagram illustrating another example condensate entraining system. Finally, a method for entraining condensate is illustrated in FIG. 4.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 48 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 and 23 having throttle plates 22 and 24, respectively. In this particular example, the position of throttle plates 22 and 24 may be varied by controller 12 to enable electronic throttle control (ETC). In this manner, throttles 21 and 23 may be operated to vary the intake air provided to combustion chamber 30 among other engine cylinders.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10. Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge-air-cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70.

Further, exhaust passage 48 may include wastegate 26 for diverting exhaust gas away from turbine 62. Additionally, intake passage 42 may include a wastegate 27 configured to divert intake air around compressor 60. Wastegate 26 and/or 27 may be controlled by controller 12 to be opened when a lower boost pressure is desired, for example.

Intake passage 42 may further include charge-air-cooler (CAC) 80 (e.g., an intercooler) to decrease the temperature of the turbocharged or supercharged intake gases. In some embodiments, charge-air-cooler 80 may be an air to air heat exchanger. In other embodiments, charge-air-cooler 80 may be an air to liquid heat exchanger. As described in more detail below, charge-air-cooler 80 may include a condensate entraining system 200.

As described above, FIG. 1 shows only one cylinder of a multi-cylinder engine, and each cylinder may similarly include its own set of intake/exhaust valves, fuel injector, ignition system, etc.

Referring now to FIGS. 2A and 2B, an embodiment of a condensate entraining system is illustrated. FIG. 2A shows a front perspective view of a condensate entraining system 200 in fluid communication with charge-air-cooler 80. FIG. 2B shows a side perspective view of condensate entraining system 200 in fluid communication with charge-air-cooler 80. The condensate entraining system may be utilized to discharge water droplets from the charge-air-cooler which may accumulate as the result of the high ambient air humidity. This may occur, for example, on surfaces of heat exchange passages within the charge-air-cooler when the surfaces are at a temperature less than the dew point of the ambient air entering the cooler. When condensation forms on these cooler surfaces it may pool at a low point of the charge-air-cooler, for example.

As shown in FIGS. 2A and 2B, the direction of engine airflow entering charge-air-cooler 80 is indicated generally by arrow 202, and engine airflow exiting charge-air-cooler 80 is indicated generally by arrow 204. However, it will be appreciated that engine air may enter and exit charge-air-cooler 80 at other airflow directions and the engine airflow as indicated by arrows 202 and 204 is provided as one non-limiting example. Likewise, other charge-air-cooler geometries than those depicted in FIGS. 2A and 2B are possible without departing from the scope of this disclosure.

As introduced above, engine air may enter via a first engine air passage 206 upstream from charge-air-cooler 80. Engine air may then be cooled via heat exchange with ambient air, indicated generally at 208, and may then exit via a second engine air passage 210 downstream from charge-air-cooler 80. In other words, engine air enters at a hot side 212 of the charge-air-cooler and exits at a cold side 214 of the charge-air-cooler (directionality of charge air flow indicated generally by arrows 209), wherein 'hot' and 'cold' indicate a relative temperature of the engine air as it passes through the charge-air-cooler. In this way, ambient air 208 cools compressed engine air via heat exchange as the engine air passes through the charge-air-cooler. However, the compressed engine air entering the charge-air-cooler may condense, as described above. In this sense, first engine air passage 206 may deposit condensate within the charge-air-cooler.

For example, accumulated condensate 216 may pool at a low point 218 of charge-air-cooler 80. In other words, the low point may be a condensate collector 220 positioned within an interior of charge-air-cooler 80. As such, the condensate collector 220 may be in fluid communication with first engine air passage 206, which may be one source for condensate.

Condensate entraining system 200 may be configured to capture and direct charge airflow in order to generate an air pressure force to drive accumulated condensate 216 out of charge-air-cooler 80. In other words, condensate entraining system 200 may be configured to harness engine airflow to transport accumulated condensate 216 out of charge-air-cooler 80. Condensate entraining system 200 may include an air capture device 222 and a condensate conduit 224. As shown, at least some portions of air capture device 222 and condensate conduit 224 may be positioned within an interior cavity of charge-air-cooler 80 and/or an engine air passage. In this way, condensate entraining system 200 may be integrated with charge-air-cooler 80 and/or engine air passage 210, for example.

As shown, charge-air-cooler 80 may include a plurality of heat exchange passages 225 and a plurality of ambient air passages 226. Heat exchange passages 225 may provide a conduit for charge air to be cooled by ambient air cross-flow passing through the plurality of ambient air passages 226. In this way, compressed engine air is cooled upstream from the combustion chambers. An air capture device 222 positioned within an interior of the charge-air-cooler, may be coupled to at least one of the heat exchange passages 225 carrying charge air to capture a portion of charge air flowing through the charge-air-cooler. In one example, captured air includes boosted air from the engine's intake air system. As shown, air capture device 222 may include a funnel-shaped portion 228 coupled to the heat exchange passage. Therefore, the captured air is constricted by channeling the captured air through an air capture device that decreases in cross-sectional area. For example, a portion of the air capture device proximate to the heat exchange passage may be larger in cross sectional area than a portion of the air capture device distal to the heat exchange passage. While air capture device 222 is illustrated as a funnel it will be appreciate that other constricting airflow configurations are possible without departing from the scope of this disclosure. In this way, air capture device 222 may be in fluid communication with a heat exchange passage. As one example, air capture device 222 may be coupled to a heat exchange passage at cold side 214 to capture charge air.

As shown, air capture device 222 may be coupled to one heat exchange passage; however, other configurations are possible. For example, air capture device 222 may be coupled to one heat exchange passage such that a portion of the charge air flowing through that particular heat exchange passage is captured. As another example, air capture device 222 may be coupled to more than one heat exchange passage, where at least a portion of the charge airflow is captured from each heat exchange passage.

Further, air capture device 222 may be configured to direct the captured air to accumulated condensate 216. As shown, air capture device 222 may be configured to direct a charge air driving force to cold side 214 of the charge-air-cooler. For example, air capture device 222 may include a jet pump nozzle 230 configured to direct air from the heat exchange passage to the condensate collector at the cold side. Jet pump nozzle 230 may have a cross sectional area that is substantially smaller than a cross sectional area of the air capture device portion coupled to the heat exchange passage. In this way, the nozzle constricts the airflow and therefore a velocity of the captured airflow may be increased as the captured air is channeled through air capture device 222.

As shown in FIG. 2B, the jet pump nozzle may be angled towards a corner 232 of the charge-air-cooler. Therefore, air capture device 222 may be coupled to a heat exchange passage that enables enough space for air capture device to direct air downwards towards accumulated condensate 216. In the illustrated example, air capture device 222 is coupled to the fifth heat exchange passage from the top of charge-air-cooler 80; however air capture device 222 may be coupled to one or more other heat exchange passages. In this way, air capture device 222 may direct the constricted captured airflow downward to aerosolize the pooled condensate within the condensate collector. Further, FIG. 2B shows the nozzle directed towards a rear wall of the charge-air-cooler such that the captured airstream is redirected. The captured airstream may be redirected by the rear wall prior to contacting a surface of accumulated condensate 216. However, it will be appreciated that the air capture device nozzle may be directed to other locations and as such may have a different configuration that the one depicted in FIG. 2B. For example, the nozzle may aim a captured airstream directly at accumulated condensate 216 without redirecting the airstream.

Additionally, air capture device 222 may include a tuning vent 234. As shown, tuning vent 234 may be coupled to funnel portion 228, although the tuning vent may be positioned elsewhere. Tuning vent 234 may enable an airflow rate of the heat exchange passage to be adjustable. For example, it may be desirable to reduce the flow rate of the captured air. In another example, it may be desirable to increase the flow rate of the captured air. It will be appreciated that the flow rate of the ambient air captured may be optimized for various engine operating conditions, as described in more detail below.

The air pressure force may be directed to the condensate collector and as a result, condensate droplets 236 may form. Condensate conduit 224 may be configured to receive condensate droplets 236. As such, second engine air passage 210 may be in fluid communication with condensate collector 220 via condensate conduit 224.

In this way, condensation conduit 224 entrains condensate droplets acting as a pipeline to readmit the condensate droplets to an airstream of second engine air passage 210. A velocity of the engine airstream may be lower than a velocity of the air-droplet stream exiting the condensation conduit due to the constricted airflow effects of the air capture device to provide for condensate droplet transport, for example. As shown best in FIG. 2B, condensate droplets may be readmitted to the low velocity engine airstream at a highpoint 238 of second engine air passage 210, for example. Highpoint 238 may be vertically above low point 218 of charge-air-cooler 80, wherein the condensate collector coincides with the low point.

As such, second engine air passage 210 may include one or more bends between highpoint 238 and low point 218. In other words, the directionality of the engine air passage may change at each bend. Highpoint 238 may be located immediately downstream from a bend that transitions between an upstream passage (that is relatively vertical) and a downstream passage that is relatively horizontal as compared to the upstream passage. As shown, condensate conduit 224 may reside within an interior of second engine air passage 210; and therefore condensate conduit 224 may also include one or more bends between highpoint 238 and low point 218.

For example, the charge-air-cooler may be positioned at a front of a vehicle, and the engine air passage/condensate conduit may provide a passage that generally travels in a direction towards the rear of the vehicle and in a vertical direction (e.g., in a direction towards a hood covering the engine). In this example, an intake port of a cylinder may be positioned vertically above and behind in a rearward direction with respect to the charge-air-cooler, wherein the second engine air passage is in fluid communication with the intake port and the charge-air-cooler. In this way, highpoint 238 may be vertically above low point 218 and serve as one location to readmit condensate droplets. However, it will be appreciated that condensate droplets may be admitted to an engine air passage in other areas.

As shown in FIG. 2B, condensate conduit 224 may include a first portion 240, a second portion 242, and a transition portion 244 coupling the first and second portions. Each portion may be configured to entrain a high velocity air-droplet stream (e.g., a captured air-condensate droplet stream) which is indicated in FIG. 2B at 246.

First portion 240 may be positioned with an interior of charge-air-cooler 80. As shown, first portion 240 may include a horizontal component that aligns with a bottom surface of charge-air-cooler. In one example, the horizontal component may be parallel with the bottom surface of the charge-air-cooler. Further, first portion 240 may include a vertical component that extends vertically through charge-air-cooler 80 towards second engine air passage 210. Therefore, first portion 240 may also include a bend that enables condensation conduit 224 to transition between the horizontal component and the vertical component.

Second portion 242 and transition portion 244 may be positioned within an interior of second engine air passage 210. Therefore, second portion 242 and transition portion 244 may have a central axis that is substantially parallel to a respective central axis of second engine air passage 210. As shown, second portion 242 and transition portion 244 may be positioned substantially close to an interior wall of second engine air passage 210. In some embodiments, second portion 242 and/or transition portion 244 may be flush with an inner surface of second engine air passage 210. For example, flush portions may be welded or otherwise affixed to the inner surface.

In this way, condensate conduit 224 provides a passage for the air-droplet stream to exit charge-air-cooler 80. The condensate droplets 236 are suspended within the captured air, which acts as a vehicle to entrain condensate out of the charge-air-cooler. Therefore, condensate conduit 224 may be configured to receive charge air from the capture device and to receive condensate droplets from the condensate collector. As such, condensate conduit 224 may have a common reception inlet 250 configured to receive both captured charge air and condensate droplets. For example, the common reception inlet may have a diameter that is substantially large enough to receive both captured charge air and condensate droplets (air-droplet stream). As one example, the diameter of the common reception inlet may be larger than the diameter of the air capture device nozzle. As another example, the common reception inlet may have a funnel shape to receive the air-droplet stream. Furthermore, the common reception inlet may be angled in such a way so as to receive a laminar air-droplet stream. As such a central axis of the common reception inlet may be parallel to a direction of the captured airflow. Said in another way, the common reception inlet may have a size, shape, and position to inhibit downstream turbulent air-droplet stream effects.

Further, condensate conduit 224 may include an outlet 252, for example, proximate to high point 238. Outlet 252 may be configured to release the air-droplet stream in a direction (indicated by arrow 248) parallel with the engine airflow. As described above, a velocity of the air-droplet stream (indicated generally by arrow 246) may be greater than a velocity of the engine airflow (indicated generally by arrow 249).

In this way, condensate conduit 224 may be routed inside the charge-air-cooler and the engine air passage to entrain condensate. It will be appreciated by those skilled in the art that condensate conduit 224 may have a diameter that is small enough to prevent droplets from dripping down the inner surface of the conduit, and large enough to admit the combined flow of droplets and engine air with a pressure drop no larger than that of the engine airflow.

Therefore, the engine airflow downstream of high point 238 may include condensate droplets 236 that have been readmitted to the engine airstream, as illustrated best in FIG. 2B. It will be appreciated that the rate of readmitting condensate may be optimized for different engine operating conditions. As introduced above, tuning vent 234 may be adjusted to accommodate various engine operating conditions so as to readmit condensate to the engine airflow without causing a drop in stability of the engine. The tuning vent may at least in part be operable by a controller (e.g., controller 12 of FIG. 1).

For example, during low load steady state engine conditions, a captured air pressure force may be lower such that condensation (e.g., a relatively small amount of condensation) may be vaporized by the engine without causing a drop in stability of the engine.

In another example, during transient high load conditions in which the airflow rate of the engine may suddenly increase, a captured air pressure force may be higher to allow for condensate to be entrained at a greater rate. In this manner, the water droplets (e.g., a relatively high amount of condensation) may enter the combustion chambers at an acceptable level without resulting in engine misfire, engine stumble, loss of torque, etc.

It will be appreciated that condensate entraining system 200 is provided by way of example, and as such is not meant to be limiting. Rather, condensate entraining system 200 is provided to illustrate a general concept of using a pressure force generated by captured charge air to drive accumulated condensate out of the charge-air-cooler, and readmit the driven condensate to the engine airflow. However, it is to be understood that the structural configuration of the air capture device and the condensate conduit have a particular design to promote adequate fluid communication between these two components. For example, the funnel portion of the air capture device may capture air and provide a streamline of captured air to the nozzle for delivery to the accumulated condensate. The nozzle may aim downwards to direct the captured air towards the accumulated condensate. Additionally, the nozzle may be directed towards a rear wall that opposes the inlet of the condensate conduit so as to redirect the captured airflow prior to entering the condensate conduit inlet. As another example, the nozzle may be pointed directly at the inlet.

As shown in FIG. 2B, inlet 250 may have an opening that is horizontal to receive the air-droplet stream, wherein the condensate conduit may have a vertical portion proximate to the horizontal inlet to vertically entrain condensate out of the charge-air-cooler, as described above. Further, the particular configurations of the air capture device and the condensate conduit may be designed such that a surface area of the accumulated condensate agitated by the captured air is maximized. Said in another way, the relative spacing between the nozzle and the inlet may be such that the efficiency of entraining condensate is maximized. As another example, a bottom internal surface of the charge-air-cooler may be sloped downwards to enable the accumulate condensate to gravity feed towards the condensate conduit inlet. In this way, the accumulated condensate may be focused in a particular area and the nozzle may be aimed at the concentrated accumulated condensate.

It will be appreciated that the above description is non-limiting and components of the condensate entraining system 200 (e.g., the air capture device, the condensate conduit, etc.) may be of other suitable geometric configurations than those depicted in FIGS. 2A and 2B. Additionally, it will be appreciated that features of condensate entraining system 200 may embody configurations other than those depicted without departing from the scope of this disclosure. For example, air capture device 222 may be in fluid communication with another heat exchange passage in addition to, or alternative to the example illustrated in FIGS. 2A and 2B.

Further, it will be appreciated that air capture device 222 may be configured to capture other air to generate an air pressure force. For example, the air capture device may be configured to harness engine air from an engine air passage to drive condensate out the charge-air-cooler. For example, FIGS. 3A and 3B show an embodiment of a condensate entraining system 300 including such an air capture device to capture engine air at the hot side of charge-air-cooler 80.

FIG. 3A shows a front perspective view of a condensate entraining system 300, including air capture device 322, in fluid communication with charge-air-cooler 80. FIG. 3B shows a side perspective view of condensate entraining system 300 in fluid communication with charge-air-cooler 80. It will be appreciated that condensate entraining system 300 may include similar features as those illustrated in FIGS. 2A and 2B. Such features are indicated with common reference numbers and will not be discussed repetitively.

Similar to condensate entraining system 200, system 300 may include an air capture device 322 and condensate conduit 324. As shown, at least some portions of air capture device 322 and condensate conduit 324 may be positioned within an interior cavity of charge-air-cooler 80 and/or an engine air passage. In this way, condensate entraining system 200 may be integrated with charge-air-cooler 80 and/or engine air passage 210, for example.

Air capture device 322 may be configured to capture engine airflow and generate an air pressure force to drive accumulated condensate out of charge-air-cooler 80. As shown best in FIG. 3A, air capture device 322 may be internal to charge-air-cooler 80 and in fluid communication with first engine air passage 206 to capture engine airflow. The captured engine airflow may serve as a driving force for entraining condensate. As one example, air capture device 322 may be configured to receive engine airflow at hot side 212 of charge-air-cooler 80. Further, air capture device 322 may be configured to direct the captured air towards cold side 214 of charge-air-cooler. As shown, an outlet 302 of air capture device 322 may be configured to direct captured engine air towards condensate collector 220. In this way, captured engine air may traverse the charge-air-cooler from the hot side to the cold side in order to aerosolize accumulated condensate 216 in the form of condensation droplets 236, as described above.

Further, condensate conduit 324 may be configured to receive condensation droplets 236. As shown best in FIG. 3A, condensation conduit 324 may include a common reception inlet 350 configured to receive captured engine air and condensation droplets 236. Further, it will be appreciated that condensate conduit 324 may be similar to condensate conduit 224, as described above.

It will be appreciated that condensate entraining system 300 is provided by way of example, and as such is not meant to be limiting. Rather, condensate entraining system 300 is provided to illustrate a general concept of using a pressure force generated by captured engine air to drive accumulated condensate out of the charge-air-cooler, and readmit the driven condensate to the engine airflow, similar to condensate entraining system 200. As such, components of the condensate entraining system 300 (e.g., the air capture device, the condensate conduit, etc.) may be of other suitable geometric configurations than those depicted in FIGS. 3A and 3B. Additionally, it will be appreciated that features of condensate entraining system 300 may embody configurations other than those depicted without departing from the scope of this disclosure. For example, air capture device 322 may be configured to receive engine air from first engine air passage 206 at another location than the illustration provided in FIGS. 3A and 3B. As another example, air capture device 322 may be configured to capture engine air from a bypass of first engine air passage 206. As such, portions of air capture device 322 may be located external to charge-air-cooler 80.

Further, it will be appreciated that condensate entraining system 300 may be included in an air-to-air charge-air-cooler or an air-to-liquid charge-air-cooler since the driving force is generated from captured engine air. Further, it will be appreciated that an air capture device may be configured to capture ambient cross-flow air from an ambient air passage to generate an air pressure driving force to transport accumulated condensate out of the charge-air-cooler. In such examples, the air capture device may be configured for an air-to-air charge-air-cooler.

Turning to FIG. 4, a method 400 for entraining condensate is provided. At 402, method 400 includes accumulating condensate within a charge-air-cooler. For example, charge-air-cooler 80 may accumulate condensate at a low point of the charge-air-cooler. Gravitational forces may result in condensation pooling at the low point, thus the low point serves as a natural reservoir for condensation to accumulate during engine operation.

At 404, method 400 includes driving accumulated condensate through a condensate conduit via an air pressure force generated by captured airflow (e.g., charge airflow, engine intake airflow, etc.). For example, the air pressure force may be generated by capturing only a portion of the charge airflow from a heat exchanger of the charge-air-cooler. In other words, a charge-air-cooler may include a plurality of heat exchangers and the air pressure force may be generated from a single heat exchange passage, for example. In another example, the air pressure force may be generated from more than one heat exchange passage. As described above, an air capture device (e.g., air capture device 222 of FIG. 2B) may be configured to capture the charge airflow in order to generate the air pressure force. Said in another way, the air capture device may be configured to harness the kinetic energy of the charge airflow.

Further, it will be appreciated that driving the accumulated condensate out of the charge-air-cooler via the condensate conduit may include directing the charge airflow to the low point of the charge-air-cooler. As indicated above, the capture air device may be configured to direct the charge airflow to the low point of the charge-air-cooler.

Returning to FIG. 4, at 406, method 400 includes readmitting the driven condensate to an intake passage downstream of the charge-air-cooler. For example, the driven condensate (i.e., condensate droplets 236) may be readmitted to a high point of the downstream intake passage. The high point may be vertically above and in fluid communication with the low point of the charge-air-cooler. In this way, the driven condensate may be readmitted such that the condensate droplets flow with an airstream of the downstream intake passage towards a combustion chamber. By readmitting at or downstream from the high point, the driven condensate surpasses a critical point such that condensation is prevented from accumulating within the intake passage between the charge-air-cooler and the high point. As such, condensation that has been readmitted to the downstream intake passage is prevented from pooling back to the low point of the charge-air-cooler or within a low point of the intake passage which may otherwise occur during low to moderate loads.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   an engine air passage;
   a charge-air-cooler including a plurality of heat exchange passages;
   a condensate collector positioned within a charge-air-cooler interior and in fluid communication with at least one heat exchange passage and the engine air passage; and
   an air capture device coupled to only a single heat exchange passage of the charge-air-cooler, angled toward the condensate collector, and including a funnel-shaped portion narrowing transversely along a flow direction.

2. The system of claim 1, wherein the engine air passage is upstream from the charge-air-cooler and deposits condensate into the condensate collector.

3. The system of claim 1, wherein the air capture device is coupled to the single heat exchange passage to capture and direct only a portion of charge air flowing through the charge-air-cooler to the condensate collector and wherein a portion of the air capture device proximate to the heat exchange passage is larger in cross sectional area than a portion of the air capture device distal to the heat exchange passage.

4. The system of claim 3, further including a second engine air passage downstream of the charge-air-cooler, the second engine air passage in fluid communication with the condensate collector.

5. The system of claim 4, further including a condensate conduit configured to receive both charge air from the air capture device and condensate droplets from the condensate collector through a common reception inlet.

6. The system of claim 5, wherein the condensate conduit entrains the condensate droplets to readmit the condensate droplets to an airstream of the second engine air passage via a driving force generated by the captured charge air.

7. The system of claim 6, wherein the condensate droplets are readmitted at a highpoint of the second engine air passage vertically above a low point of the charge-air-cooler, the low point being the condensate collector.

8. The system of claim 5, wherein the condensate conduit includes a first portion positioned within the interior of the charge-air-cooler and a second portion positioned within an interior of the second engine air passage.

9. The system of claim 3, wherein an airflow rate of the heat exchange passage is adjustable via a tuning vent.

10. The system of claim 3, wherein the funnel-shaped portion of the air capture device narrows along a width of the air capture device, the width perpendicular to charge air flow through the single heat exchange passage of the charge-air-cooler, the funnel-shaped portion decreasing in cross-sectional area from the single heat exchange passage and toward the condensate collector, and wherein the air capture device further includes a jet pump nozzle angled downward and toward the condensate collector to direct air from the single heat exchange passage to the condensate collector.

11. A condensate entraining system comprising:
   a charge-air-cooler including a hot side and a cold side;
   an air capture device positioned within an interior cavity of the charge-air-cooler, coupled to only a single heat exchange passage of the charge-air-cooler, angled downward, toward a low point of the charge-air-cooler, to direct a driving force from the cold side and toward the low point, and including a funnel-shaped portion with a decreasing cross-sectional area, the cross-sectional area decreasing from the at least one heat exchange passage and toward the low point of the charge-air-cooler to increase a velocity of airflow as the airflow is channeled through the air capture device, the cross-sectional area defined perpendicular to flow through the funnel-shaped portion; and
   a condensate conduit configured to receive condensate droplets generated by the driving force and in fluid communication with an engine air passage to readmit the condensate droplets to the engine air passage.

12. The system of claim 11, wherein the condensate conduit includes a first portion to receive condensate droplets, a second portion to release condensate droplets, and a transition portion coupling the first and second portions.

13. The system of claim 12, wherein the first portion of the condensate conduit is positioned within the interior cavity of the charge-air-cooler and wherein the air capture device is a conduit with an inlet and outlet, the inlet and the outlet of the conduit positioned within the interior cavity of the charge-air-cooler, the conduit also wholly positioned within the interior cavity.

14. The system of claim 13, wherein the air capture device is in fluid communication with a heat exchange passage at the cold side to capture ambient air as a source for the driving force, wherein the air capture device captures only a portion of charge air flowing through the charge-air-cooler, and wherein the inlet is coupled to the single heat exchange passage.

15. The system of claim 14, wherein the air capture device decreases in cross-sectional area from a first portion of the air capture device proximate to the at least one heat exchange passage to a second portion of the air capture device distal from the at least one heat exchange passage.

16. The system of claim 12, wherein the second portion of the condensate conduit and the transition portion are positioned within an interior of the engine air passage downstream from the charge-air-cooler.

17. A method for entraining condensate, comprising:
   accumulating condensate within a charge-air-cooler;
   driving accumulated condensate through a condensate conduit via an air pressure force generated by capturing only a portion of charge airflow and directing the portion of charge airflow toward a condensate collector with an air capture device, the air capture device bypassing all heat exchange passages of the charge-air-cooler and including an inlet and outlet positioned within an interior cavity of the charge-air-cooler, and a funnel-shaped portion narrowing in cross-sectional area from the inlet to the outlet, the cross-sectional area defined perpendicular to flow through the funnel-shaped portion; and readmitting the driven condensate to an intake passage downstream of the charge-air-cooler.

18. The method of claim 17, wherein the air capture device extends between a hot side and cold side of the charge-air-cooler, wherein the inlet is at the hot side and the outlet is at the cold side, wherein capturing the charge airflow includes capturing only the portion of the charge airflow from a heat exchange passage.

19. The method of claim 18, further comprising directing the charge airflow to a low point of the charge-air-cooler.

20. The method of claim 18, wherein the driven condensate is readmitted at a high point of the downstream intake passage, the high point vertically above and in fluid communication with a low point of the charge-air-cooler.

* * * * *